A. C. SINCARE.
FOLDING STEERING WHEEL.
APPLICATION FILED DEC. 14, 1917.
1,268,505.
Patented June 4, 1918.
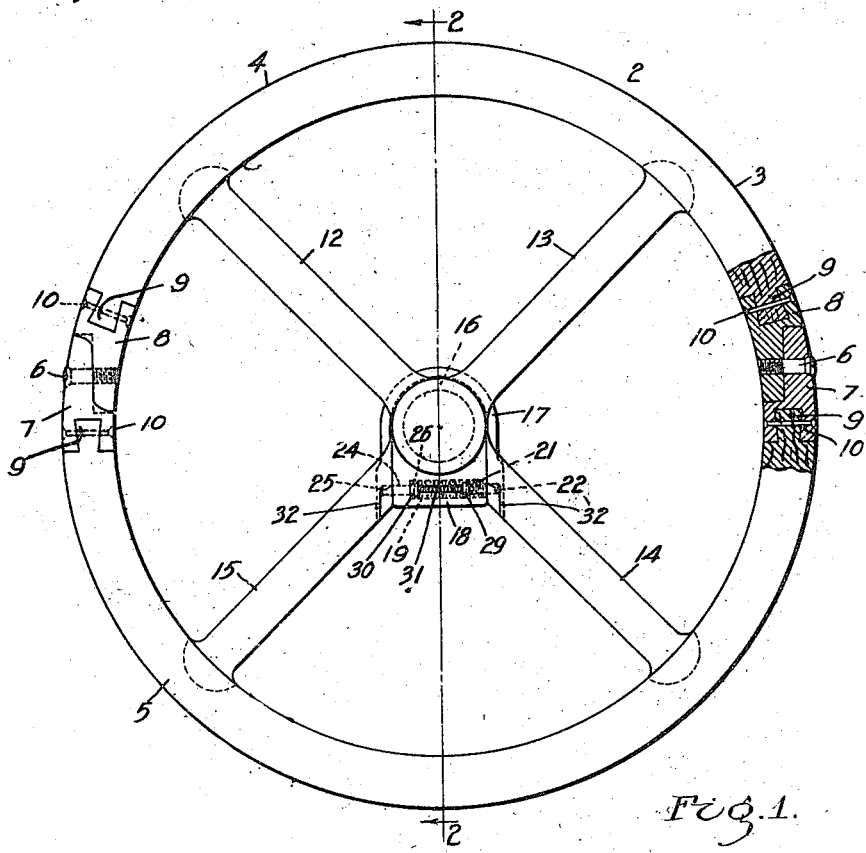
Fig. 1.
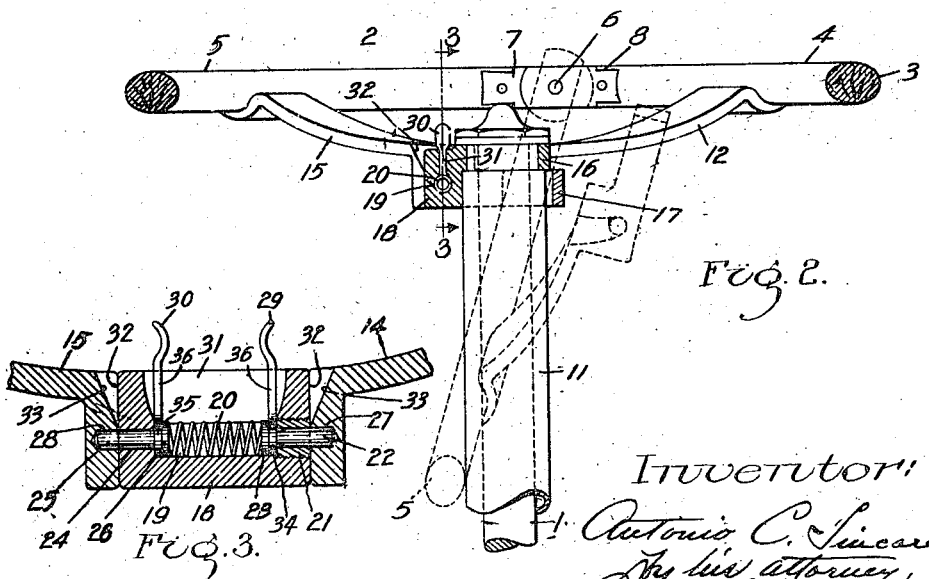
Fig. 2.
Fig. 3.
Inventor:
Antonio C. Sincare,
By his attorney,
Charles N. Gooding.

UNITED STATES PATENT OFFICE.

ANTONIO C. SINCARE, OF WINTHROP, MASSACHUSETTS.

FOLDING STEERING-WHEEL.

1,268,505.  Specification of Letters Patent.  Patented June 4, 1918.

Application filed December 14, 1917. Serial No. 207,025.

*To all whom it may concern:*

Be it known that I, ANTONIO C. SINCARE, a citizen of the United States, residing at Winthrop, in the county of Suffolk and State of Massachusetts, have invented new and useful Improvements in Folding Steering-Wheels, of which the following is a specification.

This invention relates to improvements in folding steering wheels for motor vehicles.

The object of the invention is to provide a simple, strong and neat steering wheel which is so constructed that the forward portion of the wheel, which must necessarily be so close to the operator of the vehicle as to interfere with said operator's movements in getting into and out of the vehicle, may be folded into a position where it will not be touched or in the least interfere with said movements of the operator.

The invention consists in the combination and arrangement of parts set forth in the following specification and particularly pointed out in the claims.

Referring to the drawings:

Figure 1 is a plan view of a steering wheel embodying my invention.

Fig. 2 is a section taken on the line 2—2 of Fig. 1, dotted lines in said figure indicating the folded position of said wheel.

Fig. 3 is a section taken on the line 3—3 of Fig. 2.

Like numerals refer to like parts in all views of the drawings.

In the drawings, 1 is a shaft, through which the movements of a steering wheel 2 may be transmitted to the steering mechanism, not shown. The steering wheel embodies in its construction a rim 3 of any suitable material, such as wood or the like, and this rim is formed in two parts 4 and 5 which are pivotally connected together, preferably by screws 6, 6 disposed on opposite sides of the rim with the axes alining and substantially at right angles to the axis of the shaft 1, the axes of said screws being also at one side of the axis of said shaft, preferably the upper side, making the part 5 of said rim substantially more than half of the entire rim. Furthermore, the pivotal axis of said rim portion is disposed substantially in the central plane of rotation of said rim.

The material of which the rim 3 is constructed which, as previously stated, is of wood, is not of sufficient strength to provide bearings for the pivotal screws 6; therefore hinge members 7 and 8 are interposed between the adjacent ends of each side of said rim, and the adjoining portions of said hinge members and said rim sections are dovetailed at 9 and secured together by rivets 10. In the present instance the dovetails extend vertically of the rim 3, although the result would be equally as good if said dovetails are disposed horizontally with respect to said rim.

The hinge members 7 and 8 substantially conform in shape to the rim 3 constituting continuations of said members, thus providing a smooth, uninterrupted gripping surface for the operator to take hold of when driving the vehicle. The hinge members 7 and 8 are pivotally secured together by the screws 6 and the sections of said hinge members are nicely fitted together so that no interruption will occur in the rim when the two sections of said rim are in their normal positions so that the breaking of the rim during the tilting thereof will not produce any gaps where the person or clothing of the operator can, in anywise, become caught or pinched when the rim is returned to its normal position.

The smaller part 4 of said rim is placed upon the opposite side of the shaft 1 from the operator and this portion is rigidly secured to the upper end of said shaft and being rigid enables the operator to assist himself in getting into and out of the seat. The other part 5 of said rim is adapted to be swung from its operative position in which it, together with the part 4, forms the complete circle of the rim, to its inoperative position, preferably as shown by the dotted lines in Fig. 2, at which time said section 5 will rest against the rear side of the steering post 11, said steering post embodying in its construction a sleeve, within which the shaft 1 is rotatably arranged.

The support for the members 4 and 5 preferably constitutes a spider which includes four arms 12, 13, 14 and 15. The arms 12 and 13 of said spider are preferably formed in one piece with a collar 16 which is secured to the upper end of the shaft 1, the outer end of said arms being secured to the section 4 of said rim and adapted to rigidly support said section on said shaft. The arms 14 and 15 of said spider are each attached, at their outer ends, to the larger or pivotal section 5 of said rim and moreover they are united, at their inner edge, by a curved member 17, preferably formed integral with said arms 14 and 15 and partly surrounding the upper end of the steering post 11 adjacent to the collar 16.

The portions of the arms 14 and 15 where they unite with the curved member 17 are preferably parallelly disposed and the collar 16 has an enlargement 18 which is adapted to fit between said parallel section of said arms 14 and 15 and this enlargement is substantially the shape of said parallel section. The enlargement 18 is bored from one side thereof nearly to the other side, forming a chamber 19. The upper end of said chamber is adapted to be closed by a screw threaded plug 21 and said plug is drilled longitudinally thereof to receive a pin 22 which is provided with a head 23 arranged within the chamber 19.

The material between the inner or closed end of said chamber 19 and the adjacent side of said enlargement is also drilled at 24 to receive a pin 25, said pin having a head 26 which is also arranged within the chamber 19. A spring 20 is interposed between the head 23 of the pin 22 and the head 26 of the pin 25, within said chamber 19, to normally retain said heads at their respective ends of said chamber and when in said position said pins will protrude from opposite sides of the enlargement 18 into recesses 27 and 28 formed respectively in parallel portions of the arms 14 and 15.

The protruding ends of the pins 22 and 25 engage the recesses 27 and 28 and lock the pivotal portion 5 of said rim in its operative position with respect to the rigid portion 4 thereof, and to swing said pivotal section about its axis from its operative to its inoperative position, said pins 22 and 25 must be withdrawn from said recesses 27 and 28 respectively and for this purpose finger pieces 29 and 30 are provided, said finger pieces being attached to the pins 22 and 25 and arranged to project therethrough, through a slot 31 formed in said enlargement, far enough to enable the same to be manipulated by the operator.

The inner surfaces 32 of the parallel portions of said arms 14 and 15 are beveled at 33 from a point near the recesses 27 and 28 along the paths followed by the ends of the pins 22 and 25 when the part 5 of said rim is swung from its operative to its inoperative position, and these beveled surfaces are carried far enough beyond the projecting ends of said pin so that when said pins are being returned to the recesses 27 and 28 they will engage said beveled surfaces and be forced into the chamber 19 against the action of the spring until said pins are moved into alinement with their respective recesses, whereupon said spring 20 will force said pins into said recesses and automatically lock and hold said rim section in its operative position.

The finger pieces 29 and 30 are preferably constructed of sheet material having ends 34 and 35, similar in shape to the heads 23 and 26 of the pins 22 and 25, and these ends have holes extending therethrough, adapted to receive said pins 22 and 25 and fit against the heads of said pins, one of which engages the closed end and the other engages the inner end of the plug 21, said finger pieces being held in these positions by the spring 20 which exerts a separating action upon the heads of said pins.

The finger pieces 29 and 30 have shanks 36 which are substantially the same width as the slot 31 and extend from the ends 34 and 35 of said finger pieces to the operating ends thereof, said shanks being arranged to engage opposite sides of said slot 31 and retain said finger pieces in their operative positions.

To place the finger pieces upon their respective pins, said pins must, one at a time, be pushed back into the chamber 19 so that the large ends thereof may be inserted between the ends of said pins and the ends of said chamber and after these finger pieces have been inserted and turned so that the holes therein will aline with said pins; then said pins may be released and permitted to slide through said finger pieces until the heads thereof engage the finger pieces against the end of the chamber 19.

When it is desired to drop the pivotal portion of the rim from its operative to its inoperative position, the operator grasps the finger pieces 29 and 30, drawing them together, and thereby withdrawing the protruding ends of the pins 22 and 25 from their respective recesses, permitting said pivotal portion to be dropped to the position shown in dotted lines.

Having thus specifically described my invention what I claim and desire by Letters Patent to secure is:

1. A steering wheel embodying in its construction a rim formed in two parts, means for pivotally securing one of said parts to the other part to swing about an axis disposed in the central plane of rotation of said rim, and means for detachably securing the pivotal part of said rim in its operative position.

2. A steering wheel embodying in its construction, a rim formed in two parts, means for pivotally securing one of said parts to the other part to swing about an axis disposed in the central plane of rotation of said rim, the ends of each of said sections being convexly curved on an arc concentric with the axis of said pivot, the portions of the other part of said rim adjacent to said convexly curved ends being concavely recessed to correspond with said convexly curved ends, and means for detachably securing the pivotal part of said rim in its operative position.

3. A steering wheel having, in combination, a shaft, a collar secured at one end of said shaft, said collar having arms projecting laterally thereof, a wheel rim mounted upon said arms and formed in two parts, one of said parts being pivotally secured to the other, a support for the pivotal portion of said rim, said support being secured at a plurality of points to said rim and adapted to surround said collar, and means for detachably securing said support to said collar, whereby the pivoted portion of said wheel may be released and folded relatively to the other portion thereof.

4. A steering wheel embodying in its construction a rim formed in two parts, pivotally connected metal hinge members secured respectively to adjacent portions of said rim; adapted to permit one part of said rim to be swung from an operative to an inoperative position, a pair of oppositely disposed spring actuated members for automatically locking the swinging portion of said rim in its operative position, and means for operating said spring actuated members to release the swinging portion of said rim.

In testimony whereof I have hereunto set my hand in presence of two subscribing witnesses.

ANTONIO C. SINCARE.

Witnesses:
CHARLES S. GOODING,
SYDNEY E. TAFT.